UNITED STATES PATENT OFFICE.

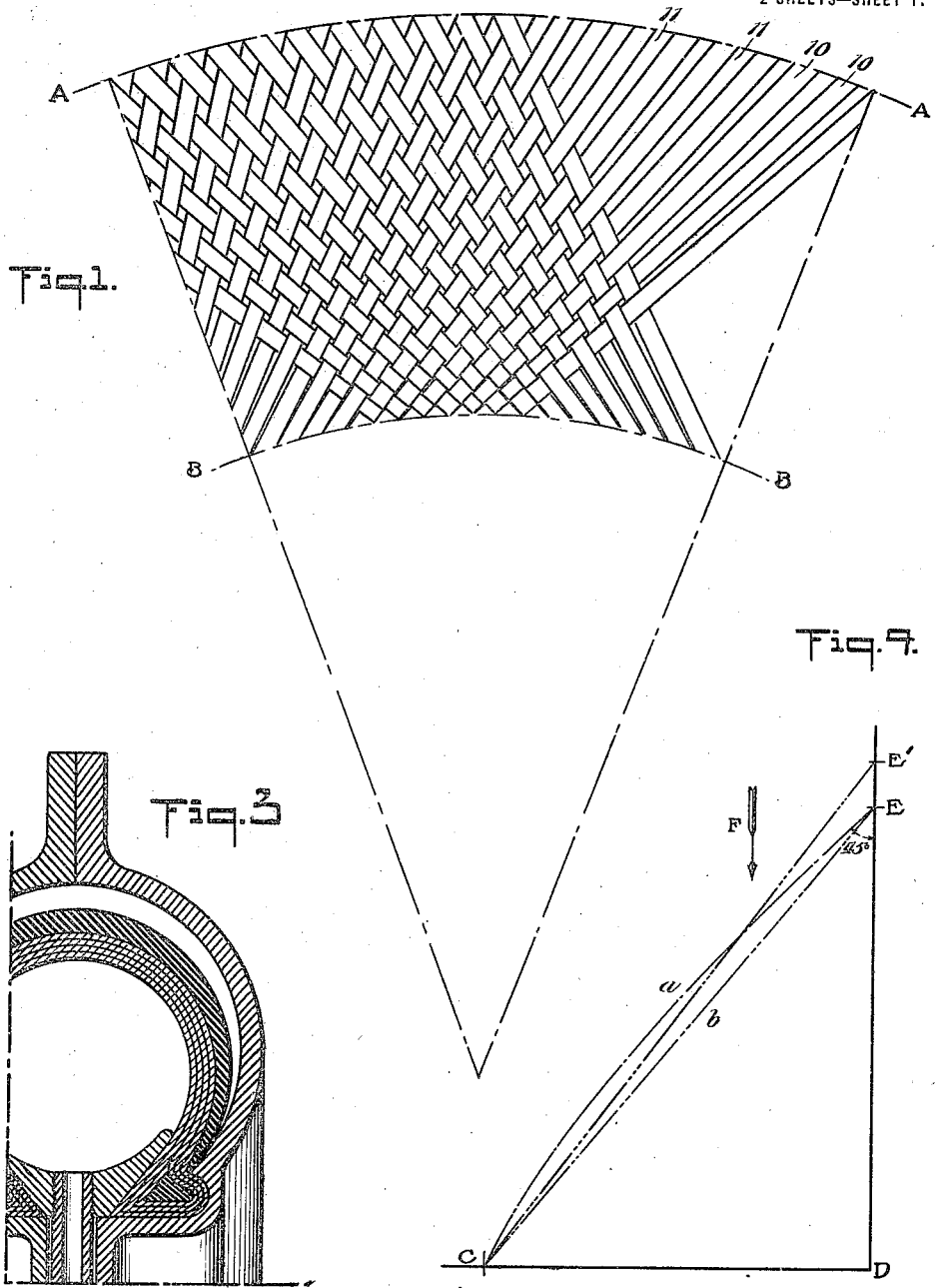

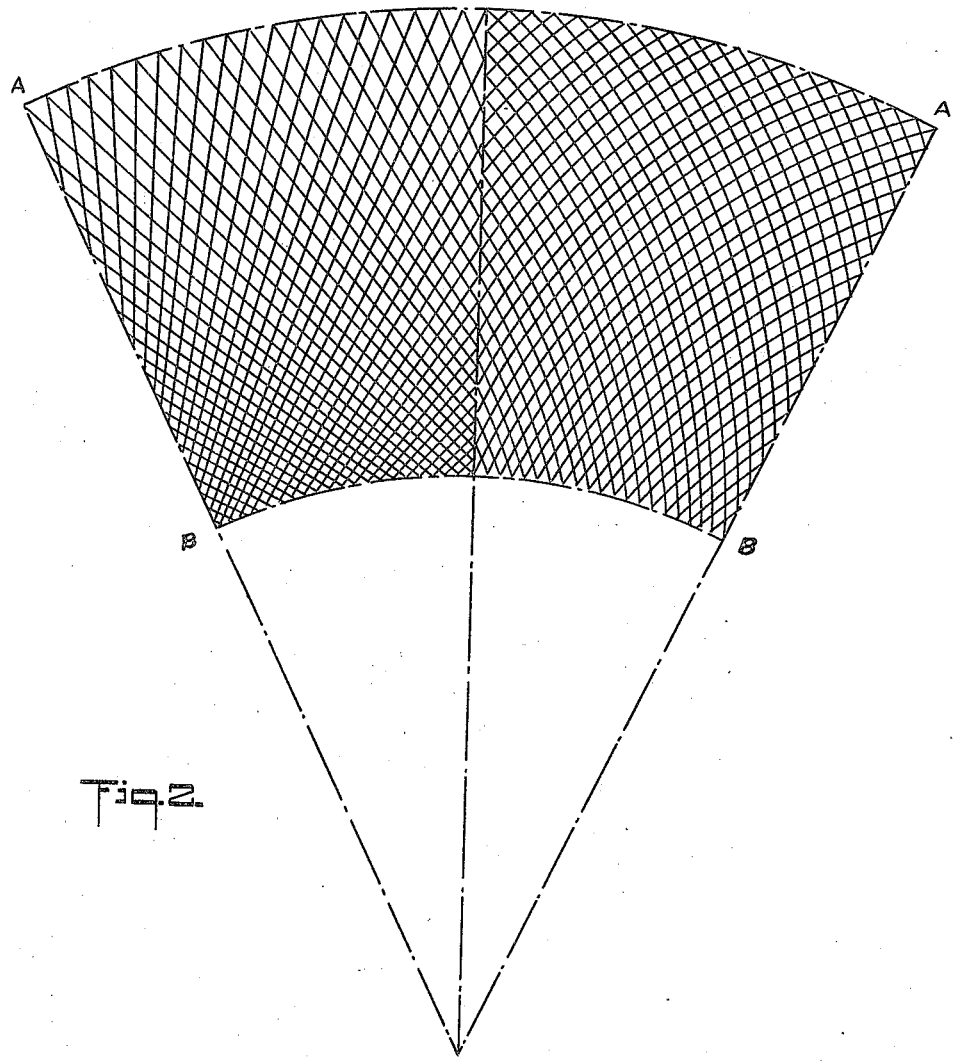

NELSON W. McLEOD, OF NEW YORK, N. Y.

PNEUMATIC-TIRE CASING.

1,423,771.   Specification of Letters Patent.   Patented July 25, 1922.

Application filed January 15, 1920. Serial No. 351,712.

*To all whom it may concern:*

Be it known that I, NELSON W. McLEOD, a citizen of the United States, and resident of New York city, in the county of New York and State of New York, have invented certain new and useful Improvements in Pneumatic-Tire Casings, of which the following is a specification.

This invention relates to the construction of pneumatic tire casings having separable bead edges along the inner periphery, the casings being built up of rubber or other similar or suitable material supported and re-enforced by a plurality of layers of woven fabric.

In ordinary constructions strips of woven fabric are cut bias and laid lengthwise of the tread. The side edges of the strips are milled down or compacted to the beads and secured to, or incorporated in the beads so that the threads have their opposite ends anchored in or at the beads of the casing and each thread extends diagonally from one bead up one side, crossing the tread and down the other side of the casing to the other bead. Due to the fact that the circumference of the tire along the center line of the tread is materially greater than the circumference adjacent to the bead, and as in any one layer there are the same number of threads terminating at the beads as there are crossing the tread, it is necessary in common practice to very materially compact or condense the fabric in the portions of the side walls of the casing adjacent to the bead. In order to minimize the difficulty of this compacting or this condensing of the fabric in the vicinity of the bead, it is customary in practice to stretch the strip lengthwise of the thread and diagonally of the weave in applying it to the core or mandrel or the partially built up carcass. This permits the employment of a fabric strip having a lesser number of longer threads crossing the center line of the tread at a more acute angle.

Tires constructed as above described of the ordinary close woven fabric possess certain objectionable features or properties which tend to decrease the life of the tire and which involve difficulty in the manufacture. The close weave of the fabric prevents the rubber or other composition from passing therethrough or effecting any adequate binding between adjacent layers of fabric. Thus repeated or excessive bending particularly of the side walls tends to separate the canvas layers. The angle the threads assume when the canvas is applied is materially different at the bead than at the tread so that the strain of the inflation air tends to shift the position of all of the threads toward the true tension line. The longer the threads, the greater is the possible deviation from the true tension line and the greater is the liability of there being some weakness or defect in the thread causing it to break. If the tire be expanded by internal pressure before vulcanization, even a close woven fabric will permit the threads to pull uniformly taut approximately to the limit of the elasticity of the threads but does not permit each thread to shift laterally at intermediate points to bring it to the true tension line. The milling down and compacting tends to bring the ends of the threads toward radial lines and farther from the acute angle at which they cross the tread and, therefore, tends to bring them farther from the true tension line between the point of crossing the center of the tread and the opposite anchorage points. The fabric being stretched before it is put on results in zones along each side of the tire between the bead and the tread which are not stretched either longitudinally or transversely and require no milling and it is in the vicinity of these zones that the threads are farthest from the true tension line. The milling, therefore, does not tend to straighten these portions of the threads. The compacting or condensing of the fabric at the sides of the tire directly above the bead gives to the fabric an undesirable stiffening. The tire casing when bent at these points therefore has the strain on the threads localized to the inner or outer layers unless the layers are broken loose from each other and, therefore, the bending tends to break down the wall or develop weakness which result in blow outs.

To avoid some of these objections by stretching the usual close woven fabric transversely rather than longitudinally to increase the angle at which the threads cross the tread, shorten the threads, and bring them more nearly to the true tension lines when applied, materially increase the difficulty of compacting the fabric in the vicinity of the beads and gives even greater objectionable stiffness to the side walls of the casing.

The main objects of my invention are to so apply the threads that they lie more nearly in the proper tension lines, to increase the flexibility of the portions of the casing adjacent to the beads, and to minimize or eliminate the difficulty in causing the fabric to assume the proper position adjacent to the bead and to eliminate the necessity of compacting or condensing the fabric to such an extent that the threads thereof are flattened at their terminal portions.

As a further important advantage resulting from my invention the act of milling down the fabric over the side portions of the casing automatically tends to bring the threads more nearly to their true tension lines.

In carrying out my invention I employ a fabric having its threads slightly spaced or loosely woven, the relationship of the thread sizes and spacing being such that at the upper edge of the bead the spacing will be eliminated by the compacting and the threads will lie substantially together without being flattened or compressed and fill the available space. The threads may be of approximately the same size as those of the fabric now commonly employed, but there are a materially less number of threads in the fabric as woven for a unit of distance in both the warp and the woof. Merely as an example, an ordinary woven fabric now employed has twenty-four threads per inch measured along either the warp or the woof, and the fabric is tightly woven so that the threads lie very close together.

If this fabric be used to make a tire casing having inside dimensions of thirty (30) inches by three and one-half (3½) inches, the circumference at the tread would be 101.53 inches and the circumference at the bead 78.54 inches. Thus the ordinary fabric applied without stretching would have to have the 101.53 inches of its side edges compact or condensed to 78.54 inches which is difficult as the threads are already lying close together and it further results in a very stiff wall structure. To apply this close woven fabric without compacting at the edges would necessitate starting with a strip 78.54 inches long and stretching it to 101.53 inches which makes the very much longer threads meet the bead at 45 degrees, but cross the center line of the tread at a very much more acute angle.

In carrying out my invention I increase the spacing of the threads or reduce the number of threads of the same size for a unit of distance so that the threads may lie slightly spaced along the tread, may lie close together at the bead and will substantially take up this free space, at the bead. In other words, I make the ratio of the sum of the thread diameters to the free space between the threads approximately equal to the ratio of the bead circumference to the difference between the bead circumference and the tread circumference. For example, if the ratio between the bead circumference and the difference between the circumferences be 78.54 to 22.99 (101.53 minus 78.54) then the threads along the center line of the tread should occupy approximately 77.35 per cent of the space and the free space between the threads approximately 22.65 per cent. Therefore, if the fabric be woven of the usual threads which, in a close woven fabric, give twenty-four (24) threads to the inch, I would weave the fabric with this same size of threads but with only about sixteen or seventeen to the inch.

This spacing of the threads permits the rubber coating which is applied to the fabric before it is incorporated in the tire, to pass between the threads at their point of intersection and permit the threads at their points of intersection to more easily slip on each other. It also permits the rubber at one side of the fabric to pass through and unite with that on the opposite side and thus more effectively bind all of the layers together. The fabric may be put on without stretching lengthwise of the tread so that the threads cross each other at forty five degrees (45°) to the center line instead of at an acute angle as in present common practice. In milling the farbric down on the sides the threads may easily come together to take up the free space therebetween and will lie close together but not flattened or compressed to any material extent in the vicinity of the bead so that excessive stiffness of the wall above the bead is avoided. The milling of the fabric would begin at the center line instead of at a point spaced therefrom and, therefore, the milling tends to move down the portions of threads between the bead and the tread and bring the threads toward or to the tension line by the mere act of milling. The looser weave permits the threads to more easily slip on each other at the intersecting points. After the tire is built up and before it is vulcanized it may be subjected to internal pressure approximately equal to that to which the tire would be subjected in use, as called for in my prior Patent Number 1,029,307, this pressure being exerted before the tire is vulcanized tends to bring every tread to the true tension line by a slight slipping of the threads in respect to each other and the looser weave permits this slipping which is not possible in a tightly woven fabric. Such deviation from the true tension line as exists will be a bulging of the hypotenuse of a triangle of which a section of the bead constitutes the base and the thread itself a hypotenuse. The stretching of the tire tends to raise the apex of the triangle to bring the thread more nearly straight and the milling tends to move in the center portion of the hypotenuse toward the straight line position. As the threads lie in or near to the true tension lines and as each thread has a greater freedom of movement, it will be evident that the strain on the threads may be more uniformly distributed and the casing may be built up with the same number of layers as in the present construction, but with each layer having a lesser number of shorter threads so that there is equal, if not greater, strength secured with a lesser mass of cotton or other fabric material. If desired, one or more additional layers of fabric may be employed more than what is now used, but this will not add to the weight of the tire as each fabric layer is itself lighter. If the carcass be stretched in accordance with my process of my prior patent above referred to and then vulcanized, the threads are permanently held in the position which they tend to assume when the tire is in use and there is less liability of the threads breaking loose or chafing in the vulcanized rubber when the tire is in use.

Due to the fact that the wall of the casing curves in two directions, namely, transversely and longitudinally of the tire, a flat drawing cannot show an accurate representation of the position of the threads. Furthermore due to the small size of the threads a drawing showing the parts actual size is on too small a scale to be clear. In the accompanying drawings I have shown certain diagrammatic representations of the parts exaggerated in many particulars to facilitate an understanding of the invention.

Figure 1 is a side elevation of a portion of the tire wall shown in a single plane. The threads 10 are shown greatly enlarged in width and the spaces 11 at the periphery of the tire greatly exaggerated due to the fact that the distance between the center line A—A of the tread and the line B—B of the bead is greatly enlarged in respect to the distance from the bead to the center of the curvature, that is, the center of the wheel. This figure shows the threads coming together or constituting a close woven fabric at the bead but spaced apart or loosely woven at the tread.

Figure 2 shows a diagrammatic side elevation in a single plane, the right-hand half indicating the position which the threads tend to take in a close woven fabric with the points of intersection of the threads, equidistant in all portions of the fabric, measured along the threads. The left-hand half shows the position of the threads if each extends in a straight line from the tread line A—A to the bead line B—B.

Figure 3 shows a transverse section through the tire in a mold before the stretching by internal pressure which precedes vulcanization; and Figure 4 shows diagrammatically, a developed side elevation of a portion of the tire, one of the threads being shown in dotted lines in different positions which it takes.

In Figure 4 the line C—D represents a portion of the bead line or line of thread anchorage and the line D—E represents a development of a tire circumference transversely of the tread and from the bead line to the center of the tread. The line $CaE$ represents the position of a thread crossing the center line of the tread at forty-five degrees (45°) and curving as indicated at the right hand half of Figure 2. It will be noted that this line departs from the straight line or true tension line $CbE$ by bulging out therefrom. The milling down of the fabric transversely of the tire involves the application of pressure on the fabric substantially in the direction of the arrow F and, by reason of the loose weave of the fabric, this pressure tends to shift the position of the line $CaE$ toward the tension line $CbE$. After the carcass has been built up and is expanded by internal pressure so as to fill the mold, the expansion of the tire involves an increase of the distance from the bead to the center line of the tread. This increased distance is represented by the line DE'. As the stretching of the tire takes place by slight shifting of the threads and as this shifting more easily takes place where the weave is the loosest, the combined action of milling by pressure in the direction of the arrow F and the expansion of the tire from DE to DE' tends to bring each thread of the wall of the fabric to the line CE' and thus to the true tension line.

By the term "loose weave" I do not necessarily mean that the threads are actually spaced apart. I merely mean that the threads are not beat up to a close woven structure in the loom and that when the fabric is applied in making the tire the portions of the threads adjacent to the bead may be brought closer together depending upon the actual length of the same angular distance measured at the tread and the bead. As the bead itself of the tire casing is comparatively rigid it is immaterial how tightly the threads be compacted or how stiff be the fabric in the bead. The upper edge of the bead may be considered as the point of anchorage and as the point where the desired flexibility may end.

I have referred to the fabric as "woven" and as being made up of "threads". It will, of course, be evident that the number of warp or woof threads may be very greatly reduced in number so that a very few light threads in one direction will hold in place the desired size and arrangement of threads at right angles thereto.

The word "thread" is used broadly to include any desired size or kind of strength elements. In some tires these elements are commonly known as cords, but serve the same purpose.

Although I prefer to apply the fabric strip without stretch transversely or longitudinally of the thread it will, of course, be evident that it would be within the scope of my invention if the fabric be applied with stretch in either direction.

Having thus described my invention what I claim as new and desire to secure by Letters Patent is:

1. A pneumatic tire casing having a woven fabric strip extending lengthwise of the tread with the threads of the fabric diagonally crossing the center line of the tread and anchored at the beads, the weave of the fabric being sufficiently loose at the tread to permit the threads to come together and fill the space at the bead without material flattening or compacting.

2. A pneumatic tire casing having a fabric strip extending lengthwise of the tread with the threads of the fabric diagonally crossing the center line of the tread, the threads of the fabric along the tread being slightly spaced and said threads at the beads lying close together.

3. A pneumatic tire casing having a fabric strip extending lengthwise of the tread with the threads of the fabric diagonally crossing the center line of the tread, the threads of the fabric along the tread being slightly spaced and said threads at the beads lying close together, the warp and woof threads being the same in size and spacing.

Signed at New York city in the county of New York and State of New York this 6th day of January A. D. 1920.

NELSON W. McLEOD.